(No Model.) 2 Sheets—Sheet 2.

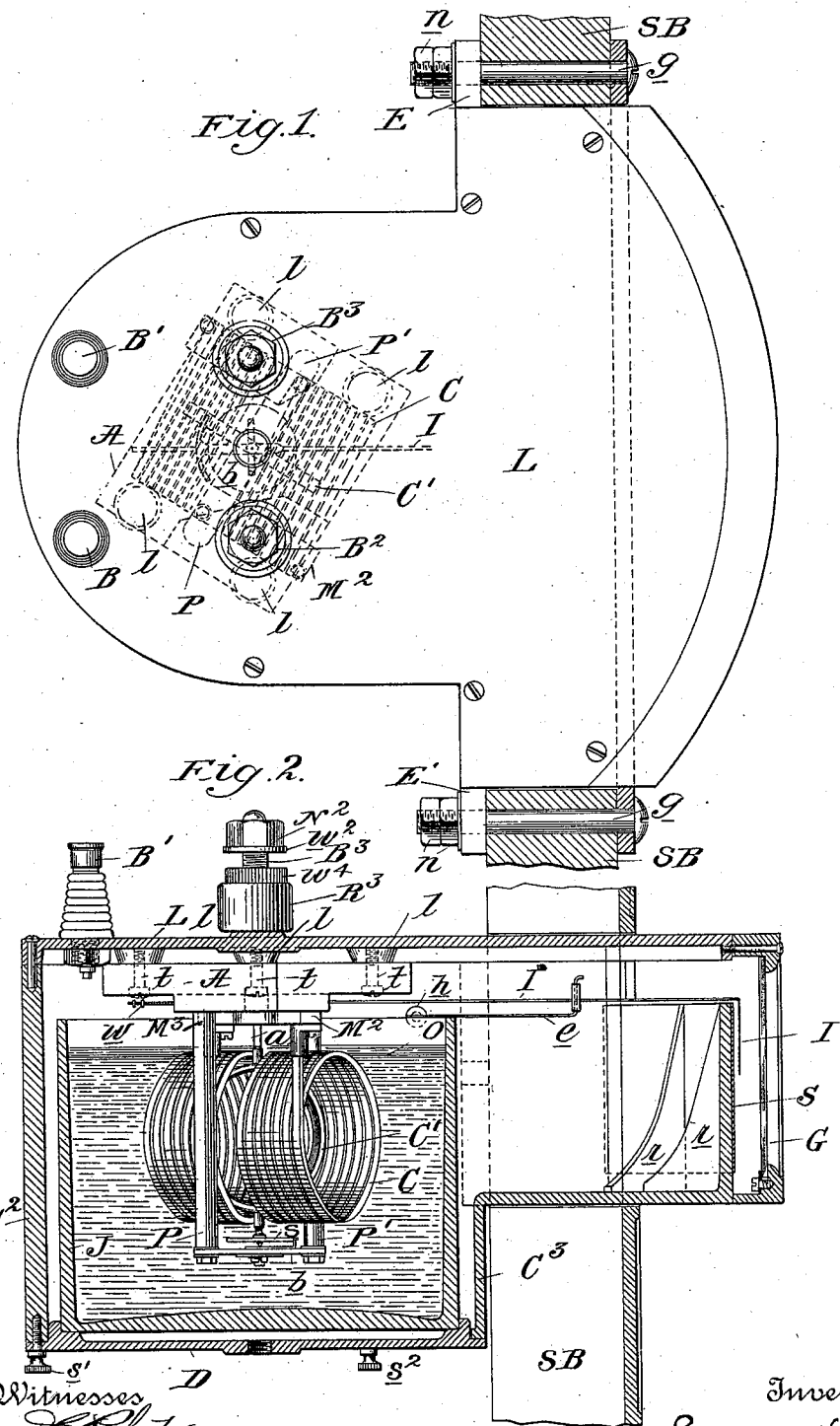

E. WESTON.
ELECTRICAL MEASURING INSTRUMENT.

No. 600,982. Patented Mar. 22, 1898.

Witnesses
Edward L. Rowland
M. M. Robinson

Inventor
Edward Weston
By his Attorney
Charles J. Kintner

UNITED STATES PATENT OFFICE.

EDWARD WESTON, OF NEWARK, NEW JERSEY.

ELECTRICAL MEASURING INSTRUMENT.

SPECIFICATION forming part of Letters Patent No. 600,982, dated March 22, 1898.

Application filed December 7, 1897. Serial No. 661,099. (No model.)

*To all whom it may concern:*

Be it known that I, EDWARD WESTON, a subject of Her Majesty the Queen of Great Britain, residing at Newark, in the county of Essex and State of New Jersey, have made a new and useful Invention in Electrical Measuring Instruments, of which the following is a specification.

My invention relates to electrical measuring instruments designed chiefly for use in connection with the measurement of alternating currents of electricity—such, for instance, as is fully disclosed in Reissue Letters Patent No. 11,250, granted to me June 28, 1892, and also in Patent No. 522,949, for improvement in wattmeters, granted to me July 10, 1894—and its objects are, first, to provide a means whereby the movable or indicating parts of such instruments may be rendered less liable to the damaging effects due to sudden fluctuations of current through the current-conveying coil or coils thereof; second, to provide a means of suspending all of the parts of such instruments within a protecting-case in such manner that the parts may be readily inspected and easily removed for repairs or adjustment; third, to provide means for preventing the oxidizing influence of light upon the binding-posts or leading-in conductors of such instruments where large-quantity currents are conveyed to the energizing parts of the apparatus, and, fourth, to provide an instrument of the nature indicated in which all of the parts shall be compactly arranged and wholly inclosed within a casing, so that they are free from dust, grit, and the like and wholly protected from the oxidizing influences of the air.

My invention will be fully understood by referring to the accompanying drawings, in which—

Figure 3:
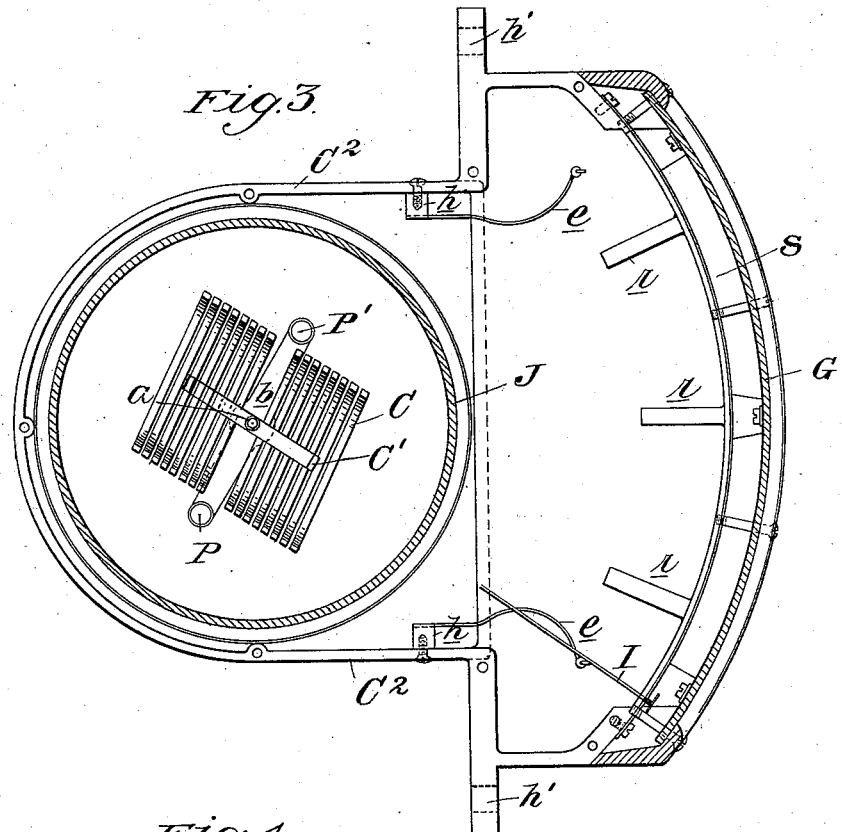
Figure 4:
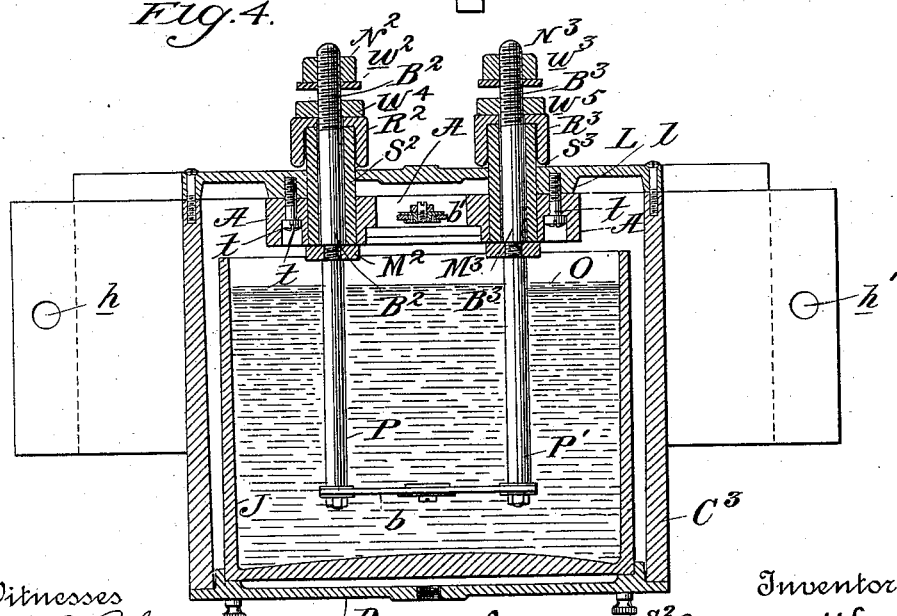

Figure 1 is a plan view thereof, illustrating the apparatus as attached to a switchboard, the operative parts of the meter being shown in dotted lines. Fig. 2 is a vertical sectional view taken through the body of the instrument, the operating-coils, their means of suspension from the lid of the instrument, the binding-posts connected thereto, and the index-needle being shown in side elevational view. Fig. 3 is a transverse sectional view taken through the body of the instrument and its operating-coils, the index-needle being shown in plan view and as adapted for use in connection with a scale, the zero-point of which is located at one side of the instrument. Fig. 4 is a vertical sectional view taken through the body of the instrument, the operating-coils and index-needle being removed.

It is a well-known fact that in the use of electrical measuring instruments where there are wide fluctuations of current to be measured the index-needle and movable parts connected thereto are often materially damaged by being swung violently to their extreme limits of vibration. With a view of overcoming this objectionable feature I have so arranged my novel current-measuring instrument that the energizing-coils and the movable parts immediately connected thereto are suspended in a substantially non-viscous liquid in such manner that the same is caused to exert a retarding influence as the parts are acted upon by varying currents, and this feature constitutes one of the essential elements of my invention hereinafter described and claimed. I have also discovered that where the current-conveying conductors are surrounded or insulated by hard-rubber sleeves or tubes light will in time so effect the surfaces of such tubes or sleeves as to often cause current leakage to a damaging extent, and to overcome this objection I protect the binding-posts thus insulated with surrounding sleeves or caps of an opaque insulating material.

Referring now to the drawings in detail, $C^2$ represents the retaining-casing, preferably made of cast metal and of the conformation shown in plan view in Fig. 1 and with a downwardly-extending rear cylindrical portion $C^3$, as shown in Fig. 2; L being a detachable or removable lid or cover secured to the body portion of the casing by screws, and D a disk-shaped bottom secured to the bottom of the casing by thumb-screws $s'$ $s^2$ $s'$ $s^2$, the upper portion of said disk being provided with a groove for the purpose of securing in position a glass or equivalent liquid-containing jar or vessel J.

Cast integral with the body part $C^2$ $C^3$ of the retaining-casing are upwardly and radially extending stiffening-knees $r$ $r$, adapted to sustain the curvilinear front surface of the instrument, upon which is secured the indicating-scale S, as clearly shown in Figs. 2 and 3, the arrangement being such that there is a sufficient opening or space between the upper portion of this scale-supporting part and the lid or cover L to permit the free swing of the index-needle to its extreme limits.

G is a curved glass plate extending entirely across the front of the instrument and secured to the casing by a supporting-frame and screws, as clearly shown in Figs. 2 and 3.

Cast integral with the lid L are four downwardly-extending lugs $l\ l\ l\ l$, adapted to receive screws $t\ t\ t$, which pass through a supporting-block A of hard rubber, ebonite, vulcanized fiber, or other insulating material.

P P' are downwardly-extending hanger-posts properly secured to the block A and supporting bridge-pieces $b\ b'$, which bridge-pieces are properly insulated and have adjustable parts for sustaining the upper ends of a vertically-arranged shaft $a$, which passes through the transverse axis of a movable coil C', having a relatively large number of turns and normally resting in the plane of the axis of a stationary coil C of relatively few turns and therefore of large current-carrying capacity. The opposite ends of this stationary coil C are secured by screws, as shown, to conducting-plates $M^2\ M^3$, attached to the under side of the insulating-block A, and are in turn connected to binding-posts $B^2\ B^3$, the convolutions being sufficiently separated at the middle part, as clearly shown in Figs. 2 and 3, to admit of the free passage of the shaft $a$, so that the movable coil or part C' may vibrate or move in opposite directions in substantially the same manner as disclosed in my prior patents above referred to. It is also apparent on inspection of Figs. 2 and 3 of the drawings that the cross-section of each individual turn or winding of the coil C is of such area that the coil will sustain itself and the individual turns be separated from each other by air-spaces sufficient to electrically insulate them.

To the opposite ends of the shaft $a$ are secured oppositely-disposed conducting retractile springs $s\ s$, (the upper one not being shown,) said springs being in turn connected to the bridges $b\ b'$, circuit connections being provided therefrom to binding-posts B B', the manner of effecting the circuit connections through the bridges $b\ b'$, the springs $s$, and the coil C' being not substantially different from that disclosed in my prior patents above referred to.

To the upper end of the shaft $a$ is attached the index-needle I, said needle being partially shown in Fig. 3 in plan view as located at the zero-point of the scale and in side elevational view in Fig. 2. The outer or index end of the needle I is turned downward at right angles, so as to move laterally in front of the scale S, as is obvious upon inspection of Fig. 2.

$w$ are counterweights for properly counterbalancing the needle.

$e\ e$ are buffer-springs located at opposite sides of the instrument and secured to the casing by screws extending inward therethrough into lugs $h\ h$, as clearly illustrated in Fig. 3, the function of these springs being to prevent any damaging influence to the light indicating-needle I should it be thrown violently to its extreme limit in either direction.

O is a liquid, preferably a non-viscous oil, placed within the jar or vessel J and having preferably such a depth as to cover all of the movable parts of the instrument except the upper end of the shaft $a$, the object of this liquid being, as hereinbefore described, to act as a damper and also to make the instrument of a dead-beat nature.

I prefer to use a substantially non-viscous liquid, such as a light petroleum-oil, which will not evaporate or assume a solid form at the temperatures where such instruments are generally used, and also for the reason that liquids of this nature are of highly-insulating qualities, it being obvious that a properly-selected oil would effectually insulate the successive turns of the coil C from each other; but I do not limit myself to any special kind of liquid so long as the same be of a substantially non-viscous nature, the especial novelty of this feature of my invention lying in the use of a dampening liquid.

I am aware that dampening devices have heretofore been applied directly to the movable parts of electrical measuring instruments by attaching thereto a fan-blade or vane and depending upon its dampening action as it swings through the surrounding air; but such devices are open to the objection that by reason of their added weight to the movable parts they give increased inertia and therefore tend to magnify rather than decrease the disturbance it is sought to eliminate.

By the use of a liquid as a dampening medium I am enabled to make the swinging or movable parts of the instrument of the lightest possible character, and to thus obviate as far as possible the objectionable feature referred to, and my claims in this particular are to be construed broadly to the use of a liquid dampening medium in which the movable parts of an electrical measuring instrument are either partially or wholly immersed. It is also obvious that where a light oil is used additional advantages are obtained in that the parts are always kept lubricated and also that the possibility of dust or grit becoming attached to the pivot-bearings is overcome, thus making it obvious that the instrument when once placed in such a medium will be substantially constant in so far as extraneous influences are concerned.

The mode of operation of my invention will be obvious to those skilled in the art, and particularly in view of my prior patents hereinbefore referred to. It will also be apparent that the instrument may be readily removed from the switchboard S B by unscrewing the nuts $n$ $n$ from the bolts $g$ $g$, extending through the eyes E E' of the retaining-casing C² and that the oil-retaining jar may be quickly and easily removed by withdrawing the thumb-screws $s'$ $s^2$ from the bottom D and an inspection of the parts had from the under side, or that the entire instrument itself may be removed by withdrawing the screws from the lid L and lifting the parts bodily out of the retaining jar or vessel J.

Referring now to Fig. 4 of the drawings for a description of my novel manner of preventing the evil effects of the oxidizing influence of light upon hard-rubber or equivalent oxidizing-sleeves which surround the binding-posts, B² and B³ represent the binding-posts designed to convey large-quantity currents to the coil C. N² and N³ represent metallic nuts, and $w^2$ $w^3$ metallic washers, $w^4$ $w^5$ being conducting set-nuts so arranged that the terminals of the conductors may be inserted between the washers $w^2$ $w^3$ and nuts $w^4$ $w^5$. S² and S³ represent hard-rubber sleeves designed to insulate the binding-posts B² B³ from the lid L, and R² and R³ are protecting-caps of any opaque insulating material, preferably of such a nature as will not readily oxidize, said caps being adapted to fit snugly over the outer or exposed ends of the hard-rubber sleeves S² S³ and being held firmly in position by the set-nuts $w^4$ $w^5$. It will be apparent, therefore, that by providing protecting-caps of opaque material I am enabled to prevent the evil effects of light upon the hard-rubber sleeves, and I find that with this arrangement there is absolutely no danger of short-circuiting currents through the surfaces of the insulating-sleeves, as was possible before such sleeves were used. In this particular I desire to be understood as claiming, broadly, a means of preventing the evil effects of light upon hard-rubber or equivalent insulating protecting-sleeves for the inleading-conductors of an electrical measuring instrument or for electrical translating devices generally.

The apparatus as herein illustrated and hereinbefore described is especially designed for a wattmeter, and the scale S is therefore necessarily calibrated for such an instrument and in such manner as to give direct indications in watts, and although the invention is particularly adapted to this especial type of apparatus many of the details thereof may be utilized in other types of current-measuring instruments, as will be appreciated by those skilled in the art to which the invention generically relates.

Although I have hereinbefore described and in the drawings have illustrated a liquid contained in a removable jar or vessel within the casing which surrounds the operative parts of the instrument, I do not limit myself to this special feature, as it is obvious that said liquid might be retained directly within the casing itself, although I prefer the arrangement herein referred to by virtue of the fact that such an arrangement makes it possible to inspect at all times all parts of the instrument without detaching or disturbing the movable parts thereof, as is fully described hereinbefore, and although I prefer to wholly immerse the movable parts of the instrument in a substantially non-viscous oil or liquid my claims to this feature are designed to be of such scope as to include, broadly, the use of a liquid as a retarding medium whether the same either wholly or partly surrounds the movable parts of the instrument.

Having thus described my invention, what I claim, and desire to secure by Letters Patent of the United States, is—

1. An electrical measuring instrument having the movable coil thereof either partially or wholly immersed in a dampening liquid, substantially as described.

2. An electrical measuring instrument having its movable coil immersed in a substantially non-viscous liquid, substantially as described.

3. An electrical measuring instrument having its movable coil immersed in a non-viscous oil, substantially as described.

4. An electrical measuring instrument having the operative parts thereof suspended from the lid of the instrument in a substantially non-viscous liquid, substantially as described.

5. An electrical measuring instrument having the operative parts thereof suspended from the lid of the instrument in a substantially non-viscous liquid contained in a jar or vessel located within the casing of the instrument, substantially as described.

6. An electrical measuring instrument having its operative parts suspended from the lid of the instrument within a liquid contained in a jar or vessel, said jar or vessel being in turn supported by a bottom detachably secured to the lower side of the casing, substantially as described.

7. An electrical measuring instrument provided with a dust-tight casing having a detachable lid and bottom, the operative parts of the instrument being suspended from the lid, in combination with a liquid-retaining jar or vessel filled with a non-viscous liquid, said vessel being sustained by the detachable bottom so that the operative parts of the instrument are immersed in the liquid, substantially as described.

8. An electrical measuring instrument having a stationary coil of large current-carrying capacity, the individual turns of which are separated from each other by air-spaces, said coil being sustained or supported by points of attachment at its opposite ends and immersed in an insulating liquid, substantially as described.

9. An electrical measuring instrument having an inclosing casing and a removable lid therefor, a stationary coil of large current-carrying capacity having its individual turns insulated from each other by air-spaces and its ends sustained or supported from an insulating-block secured to the under side of said lid, in combination with a movable coil pivotally sustained within the magnetic field of said stationary coil and having an indicating-needle secured to its rotary supporting-shaft, and circuit connections running to binding-posts, substantially as described.

10. A translating device, such for instance as an electrical measuring instrument, provided with one or more binding-posts having surrounding insulating-sleeves of oxidizable material, such as hard rubber, in combination with opaque protecting-caps for shielding the same from the action of light, substantially as described.

11. An electrical measuring instrument having its movable parts suspended in a substantially non-viscous liquid, in combination with an indicating-needle and one or more buffer-springs located at the opposite ends of its throw or movement, substantially as described.

12. An electrical measuring instrument having a dust-tight casing which surrounds all of the operative parts thereof, said parts being suspended from the lid, the casing being provided with a detachable bottom for affording access thereto from beneath, substantially as described.

13. An electrical measuring instrument having all of its operative parts inclosed in a dust-tight casing detachably secured to a switchboard, said operative parts being secured to a removable lid, in combination with a detachable bottom for affording access to the operative parts of the instrument from beneath, substantially as described.

In testimony whereof I have hereunto subscribed my name this 2d day of December, 1897.

EDWARD WESTON.

Witnesses:
C. J. KINTNER,
JOHN C. YOUNG.